Aug. 24, 1943.   A. SILFEN   2,327,827
LAWN MOWER SHARPENER
Filed March 10, 1941
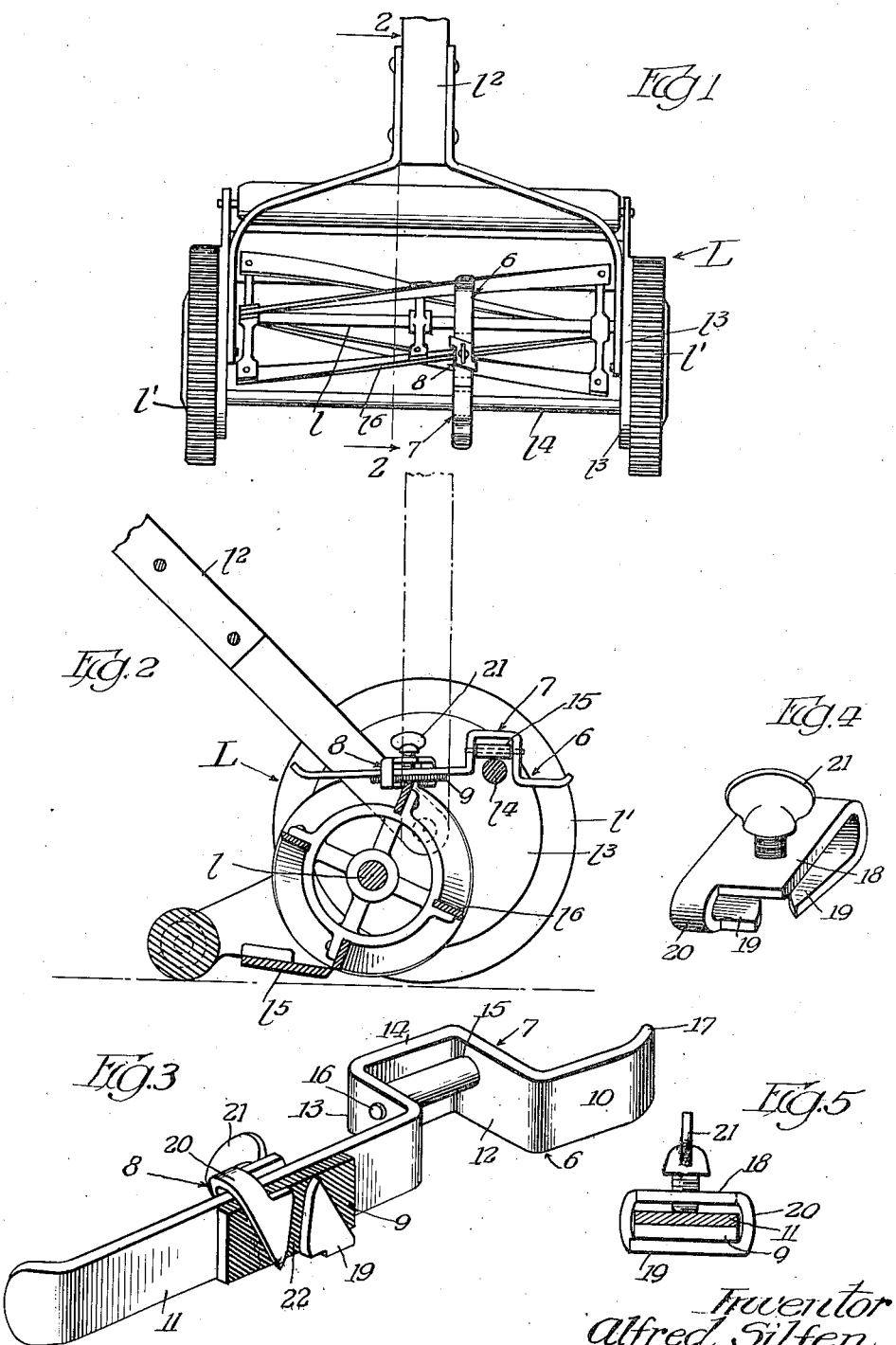
Inventor
Alfred Silfen
By Fred Gerlach
Atty.

Patented Aug. 24, 1943

2,327,827

UNITED STATES PATENT OFFICE 2,327,827

LAWN MOWER SHARPENER

Alfred Silfen, Berkeley, Ill.

Application March 10, 1941, Serial No. 382,508

1 Claim. (Cl. 76—82.1)

The present invention relates generally to sharpeners for conventional or standard lawn mowers. More particularly the invention relates to that type of lawn mower sharpener which comprises a metallic bar with a U-shaped guide at one end thereof and a longitudinally adjustable file retaining bracket at its other end, and is used by first manipulating the bar in such manner as to bring it into a transverse position with respect to the blade equipped rotor of the lawn mower to be sharpened and at the same time to bring the U-shaped guide into straddled relation with the tie rod between the gear housings of the mower and the file into engaging or contacting relation with one of the spiral blades of the rotor, and then grasping the ends of the bar and shifting the bar back and forth between the wheels of the lawn mower in order to cause the file to move along the one blade and sharpen the latter.

One object of the invention is to provide a lawn mower sharpener of this type which is an improvement upon, and has certain inherent advantages over, previously designed sharpeners of the same general character.

Another object of the invention is to provide a lawn mower sharpener of the type under consideration in which the U-shaped guide is formed as an integral part of the bar by striking upwards or otherwise shaping one end of the bar and carries between the upper ends of the side pieces thereof a cross pin which serves to prevent spreading of the side pieces of the guide and supports a freely rotatable roller which is adapted to ride on the tie rod of the lawn mower to be sharpened and facilitates sliding movement or shift of the bar back and forth between the wheels of the mower.

A further object of the invention is to provide a lawn mower sharpener of the last mentioned type and character in which the bracket carrying end of the bar extends downwards at an angle of approximately 170° with respect to the end with the U-shaped guide in order properly or most advantageously to position the file with respect to the spiral blade that is to be sharpened.

A still further object of the invention is to provide a lawn mower sharpener which not only is essentially simple in design and may be manufactured at a low and reasonable cost but also is rugged and durable and effectively and efficiently fulfills its intended purpose.

Other objects of the invention and the various advantages and characteristics of the present lawn mower sharpener will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like letters and numerals of reference denote corresponding parts throughout the several views:

Figure 1 is a plan view of a lawn mower having applied thereto a sharpener embodying the invention;

Figure 2 is a vertical transverse section taken on the line 2—2 of Figure 1 and showing the sharpener in its operative or blade sharpening position;

Figure 3 is a perspective of the sharpener, illustrating in detail the construction and design of the bar, the U-shaped roller equipped guide and the file retaining bracket;

Figure 4 is a perspective view of the bracket; and

Figure 5 is a transverse section of the bracket.

The sharpener which is shown in the drawing constitutes the preferred form or embodiment of the invention. It is illustrated in connection with a lawn mower L and serves, as described more in detail hereinafter, as a medium for sharpening the rotatable blades of the lawn mower. As shown or illustrated in the drawing the lawn mower L is of conventional or standard design and comprises a horizontally extending rotor 1, a pair of ground wheels 1¹, at the ends of the rotor, and a handle 1². Gearing (not shown) in housings 1³ serves to drive the rotor from the wheels during forward travel of the lawn mower. In addition to the aforementioned parts the lawn mower comprises a tie rod 1⁴ between the gear housings 1³ and a fixed horizontally extending knife bar 1⁵. The rotor is provided with a plurality of equidistantly spaced spiral blades 1⁶ and these, as well understood in the art, are adapted in connection with forward travel of the lawn mower successively to traverse the knife bar 1⁵ and effect the desired cutting of the grass. The knife bar is located at the bottom of the lawn mower and the tie rod 1⁴ is located above and slightly forwardly of the blade equipped rotor.

As its parts the sharpener comprises a bar 6, a U-shaped guide 7 at one end of the bar, and a longitudinally adjustable bracket 8 on the other end of the bar. The bracket serves as a retainer for a file 9.

The bar 6 is formed of flat metal stock and is adapted in connection with use of the sharpener to be placed in a transverse position over the lawn mower rotor, as shown in Figures 1 and 2. It consists of a short straight end part 10 and a long straight end part 11 and has the guide 7 formed as an integral part of it. The guide is formed by striking upwards or otherwise shaping the portion of the bar directly inwards of the short end part 10 and serves as a medium for connecting together the two end parts 10 and 11. It is adapted in connection with use of the sharpener to straddle and slide lengthwise of the tie rod 14 of the lawn mower L and consists of a pair of laterally spaced parallel side pieces 12 and 13 and an upper cross piece 14 (commonly called a shrub bar). The side piece 12 is approximately twice as long as the side piece 13 and extends between and joins the inner end of the end part 10 and the outer end of the cross piece 14. It extends at true right angles to the end part 10 and is truly normal to the upper cross piece 14. The side piece 13 of the guide 7 extends between and is joined to the inner end of the long end part 11 of the bar 6 and the inner end of the upper cross piece 14. It extends at true right angles to the cross piece and is held in spaced relation with the side piece 12 by the upper cross piece 14. The cross piece is of such length that the two side pieces are spaced a sufficient distance apart to accommodate between them lawn mower tie rods of various sizes, shapes and thicknesses. In order to facilitate sliding movement of the guide with respect to the tie rod 14 in connection with use of the sharpener a roller 15 is provided. This roller directly underlies and extends in parallel relation with the upper cross piece 14 of the guide 7 and is rotatably supported on a pin 16. The latter extends between the two side pieces of the guide 7 and in effect forms a tie rod for rigidly cross connecting the two side pieces and preventing spreading of the latter during use of the sharpener. The ends of the pin project through coaxial or aligned holes in the upper ends of the side pieces 12 and 13 and are up-set or riveted-over in order to prevent axial displacement of the pin with respect to the guide. When the sharpener is in use the roller 15 rides upon the upper portion of the lawn mower tie rod 14, the side pieces 12 and 13 extend vertically, and the short end part 10 of the bar 6 extends horizontally, as shown in Figure 2. Because the roller is rotatably supported by way of the pin the guide is permitted to travel freely along the tie rod. The guide serves to restrict or limit endwise or lengthwise movement of the bar during use of the sharpener. Because the side piece 12 of the U-shaped guide 7 is approximately twice as long as the side piece 13 it effectively hooks around the front portion of the lawn mower tie rod 14 when the sharpener is in use and hence prevents the guide 7 from jumping off or leaving the tie rod in connection with a blade sharpening operation. The end part 11 of the bar is approximately three times longer than the end part 10 and carries the file retaining bracket 8. It is bent slightly downwards so that it extends at substantially a 170° angle with respect to the end part 10. Because the side piece 13 of the guide 7 is shorter than the side piece 12 and the end part 11 of the bar extends downwards at a slight angle the sharpener as a whole may be readily applied to any standard or conventional lawn mower and the file which, as shown in Figure 3, fits flatly against the bottom face of the end part 11, is properly positioned with respect to the edge of the blade to be sharpened during use of the sharpener. As a general rule the edges of lawn mower blades are slightly bevelled, as shown in Figure 2. By having the end part 11 of the bar angularly positioned with respect to the end part 10 the file 9 in connection with use of the sharpener, is so held or positioned that it fits properly and flatly against the edge of the blade to be sharpened and thus sharpens the blade with the proper or desired bevel. The outer extremities of the end parts 10 and 11 of the bar are bent and curved upwards to form handles 17 whereby the bar may be gripped between the thumbs and forefingers when it is shifted back and forth for blade sharpening purposes. Because of the design of the U-shaped guide 7 and the angularity and and length of the long end part 11 of the bar 6 the two handles 17 are horizontally aligned during use of the sharpener and the user of the sharpener is thus better able to shift the bar 6 back and forth.

The bracket 8 surrounds and is slidable lengthwise of the long straight end part 11 of the bar 6. It serves in addition to holding or retaining the file 9, to guide the blade to be sharpened with respect to the file and comprises a diamond shaped top piece 18, a pair of opposed oppositely or reversely positioned wedge shaped bottom pieces 19 and a pair of U-shaped tab-like connecting pieces 20 between the top piece and the bottom pieces. The top piece 18 overlies the top face of the end part 11 of the bar and has a central internally threaded hole through which a wing equipped clamp screw 21 extends. The bottom pieces 19 are spaced laterally apart so as to define or form between them a diagonal guide channel 22. This channel is angled in conformity with the spiral of the blades 16 of the lawn mower rotor and is adapted in connection with use of the sharpener to receive the blade to be sharpened and cause the blade in connection with reciprocation or back and forth movement of the bar between the lawn mower wheels, to rotate first back and then forwards. The file 9 overlies the bottom pieces 19, as shown in Figure 3, and fits flatly against the bottom face of the end part 11, as hereinbefore pointed out. When the screw 21 is tightened the upper piece 18 of the bracket is urged away from the end part 11 and this causes the bottom pieces to hold the file in clamped relation with said end part. The file is preferably held by the bracket so that the central portion thereof traverses or extends across the top of the guide channel 22. Adjustment of the bracket and file is effected by loosening the wing equipped screw 21 and then sliding the bracket and file in one direction or the other so as properly to position the file with respect to the U-shaped guide 7. The corners of the wedge shaped bottom pieces are rounded or curved so that the guide channel 22 has flared ends. By having flared ends the blade to be sharpened travels freely along the guide channel during a sharpening operation. The connecting pieces 20 extend between and serve to connect the outer corners of the wedge shaped bottom pieces 19 and two of the corners of the top piece 18. They are positioned one diagonally opposite the other and permit rotative adjustment of the bracket as well as lengthwise adjustment of the bracket with respect to the end part 11 of the bar.

In using the sharpener the bar 6 is manipulated so as to bring the U-shaped guide 7 into straddled relation with the tie rod 1⁴. After proper positioning of the guide the bracket is properly adjusted and then manipulated so as to bring the blade to be sharpened between the bottom pieces 19, i. e., into the guide channel 22. When the sharpener is properly positioned the handles 17 at the outer extremities of the bar 6 are gripped and the bar is shifted back and forth between the wheels of the lawn mower L. During such movement of the bar the roller 15 rides along the tie rod 1⁴ and the file 9 engages and serves to sharpen the edge of the blade within the guide channel 22. After sharpening one blade of the rotor the sharpener is used to sharpen the other blades. By adjusting the bracket and file the sharpener may be used to sharpen various types, styles or sizes of lawn mowers.

The herein described lawn mower sharpener consists of but a minimum number of parts and hence may be manufactured at a low and reasonable cost. It effectively and efficiently fulfills its intended purpose and is characterized by the fact that it is rugged and durable. It is further characterized by the fact that it is safe to use because the U-shaped guide 7, due to its design and shape, is not likely to jump off the tie rod 1⁴ of the lawn mower in the event that the file 9 encounters a burr on the mower blade being sharpened.

The invention is not to be understood as restricted to the details set forth since these may be modified within the scope of the appended claim without departing from the spirit and scope of the invention.

Having thus described the invention what I claim as new and desire to secure by Letters Patent is:

A sharpener of the back and forth movement type designed for use in sharpening a lawn mower having a horizontal rotor with spaced apart bevel edged peripheral blades and in addition a horizontal tie rod above and slightly forwards of the rotor, and comprising a one-piece flat metal bar having the portion thereof directly inwards of one of its end parts bent upwards to form an integral inverted U-shaped tie rod straddling guide with the outer side piece thereof materially longer than, and in parallel relation with, the inner side piece, said bar having its end extremities bent upwards to form handles, and in addition having said one end part extending at right angles to the outer end piece of the guide and its other end part of materially greater length than said one end part and extending downwards at an angle of approximately 170° with respect to said one end part, a cross pin underlying and extending lengthwise of the crosspiece of the guide and having the ends thereof fixedly secured to the upper ends of the guide side pieces so that it serves to prevent spreading of said side pieces and also the end parts, and means on, and adjustable longitudinally of, said other end part of the bar for retaining a blade sharpening file against the bottom face of said other end part and also guiding the blade at the top of the lawn mower rotor with respect to the file during use of the sharpener, said bar being adapted when in its normal operating position with the guide in straddled relation with the tie rod to have said one end part project forwards from the tie rod and extend horizontally and its said other end part extend rearwards and downwards over said blade at the top of the rotor, said other end part of the bar being of such length that when the bar is in its normal operating position the handle at its outer extremity is in substantially the same horizontal plane as the handle at the outer extremity of said one end part.

ALFRED SILFEN.